United States Patent

[11] 3,597,093

| [72] | Inventor | Heinz K. Wolf |
| | | Willoughby Hills, Ohio |
| [21] | Appl. No. | 809,621 |
| [22] | Filed | Mar. 24, 1969 |
| [45] | Patented | Aug. 3, 1971 |
| [73] | Assignee | The New Britain Machine Company |
| | | Cleveland, Ohio |

[54] TOOL MEASURING AND INSPECTING APPARATUS
15 Claims, 9 Drawing Figs.

[52] U.S. Cl. .................................................. 356/165,
33/185, 33/201, 77/1, 353/80, 356/170
[51] Int. Cl. ...................................................... G01b 9/08,
G01b 11/24
[50] Field of Search ........................................... 356/164-
—167, 170, 171; 353/79, 80; 350/9; 33/185, 201;
77/1

[56] References Cited
UNITED STATES PATENTS

| 1,589,349 | 6/1926 | Bausch et al. ................. | 356/165 |
| 1,732,730 | 10/1929 | Porter et al. ................... | 356/166 |
| 2,381,634 | 8/1945 | Back ............................. | 356/166 |
| 2,487,314 | 11/1949 | Coles ............................ | 356/164 |
| 2,504,503 | 5/1950 | DeBoer et al. ................ | 356/166 |
| 2,542,755 | 2/1951 | Dietrich et al. ................ | 356/166 |
| 2,737,080 | 3/1956 | Mottu ........................... | 356/166 |

FOREIGN PATENTS

| 616,313 | 1949 | Great Britain ................ | 356/164 |

*Primary Examiner*—Ronald L. Wibert
*Assistant Examiner*—J. Rothenberg
*Attorneys*—David S. Urey, Alan C. Rose and Alfred B. Levine ABSTRACT: Tool measuring and inspecting apparatus especially adapted for setting and checking the dimensions of a boring bar and the like, including a vertically movable tool holder assembly for holding a tool in a vertical position, an optical projector assembly for viewing the cutting portion of the tool, means for vertically raising the tool holder assembly from a reference position below the projector assembly and for moving the projector assembly horizontally from a reference position, whereby the projector assembly can be centered on the cutting portion of the tool, and optical linear measuring systems for use in gauging the depth dimension of the tool along its vertical axis between a gauge line and the tool point and in gauging the diameter dimension of the tool along the axis of movement of the projector assembly.

Fig. I

INVENTOR.
HEINZ K. WOLF
BY Watts, Hoffmann, Fisher & Heinke
ATTORNEYS

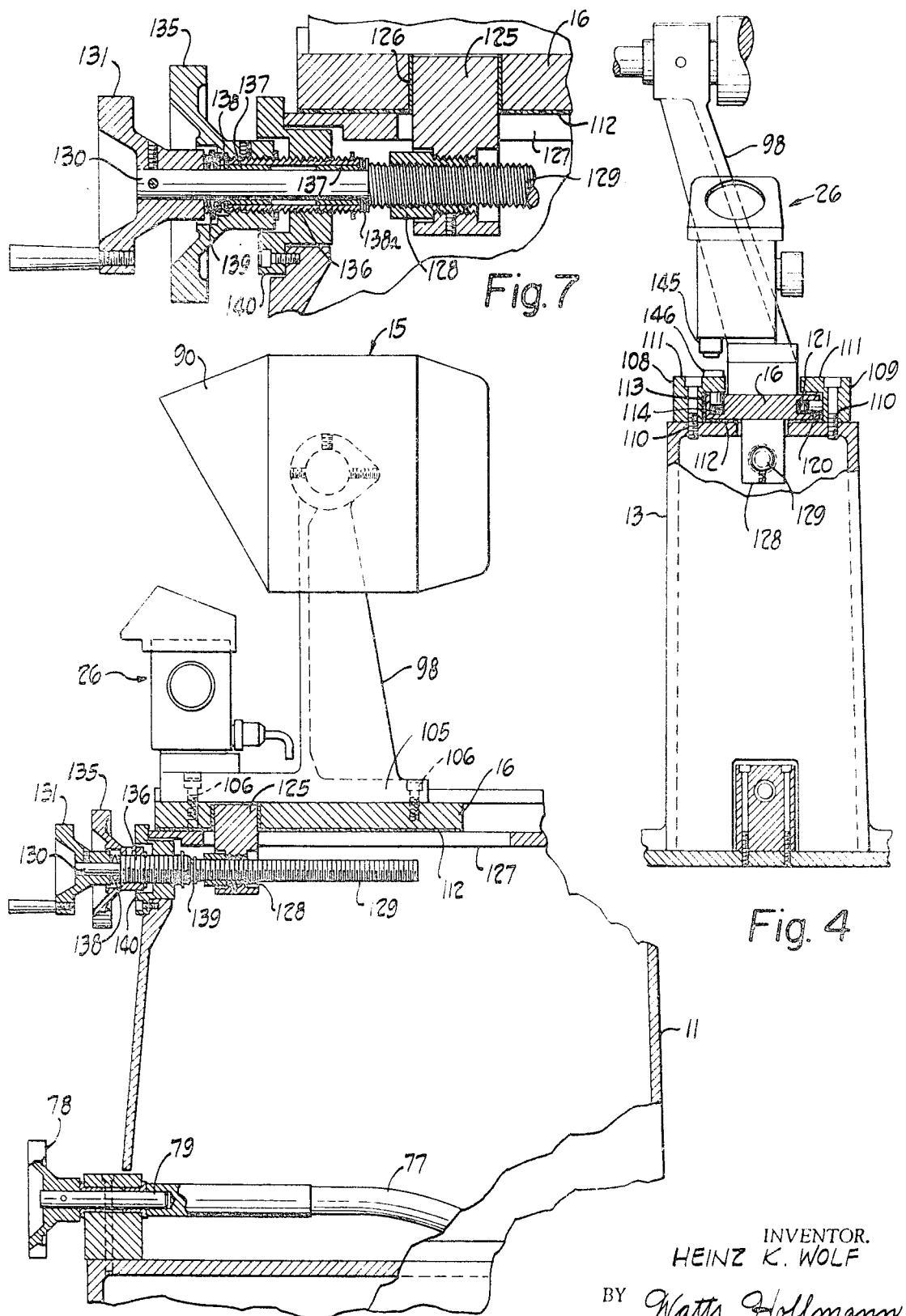

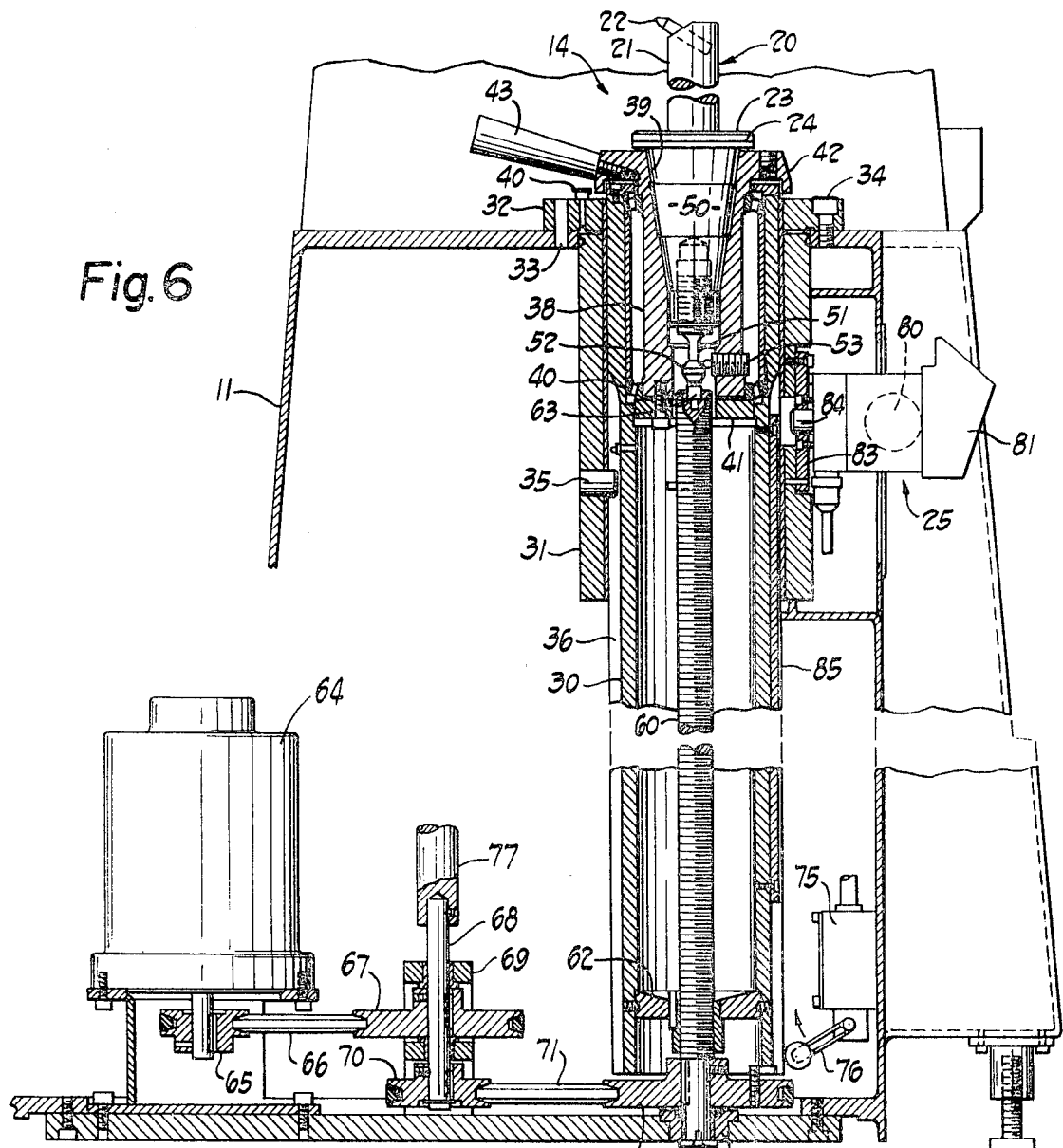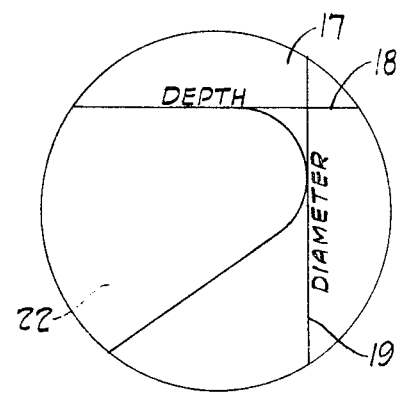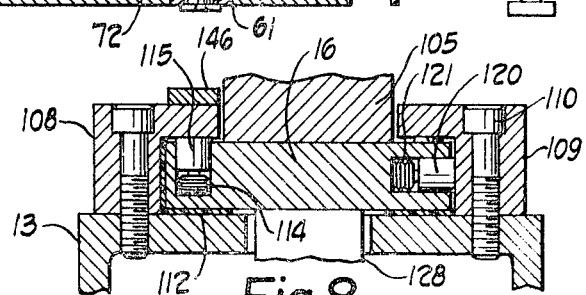

3,597,093

TOOL MEASURING AND INSPECTING APPARATUS

BACKGROUND OF THE INVENTION

The present invention relates generally to tool measuring and inspecting apparatus, and more specifically to apparatus for setting and checking the dimensions of boring bars and the like.

The accuracy of machines for optically gauging tool dimensions, for example, the depth dimension of a boring bar measured along its longitudinal axis between a gauge line and the tool point and the effective cutting diameter of the tool, depends upon several factors, including the position in which the tool is held for the measuring operation, the construction and arrangement of the slides, etc. for moving the tool, and the manner of mounting the optical systems of the machine. When the tool is mounted horizontally rather than vertically, the axial deflection of the tool can cause inaccuracies in the measuring operation. In some conventional machines in which the tool is located vertically, the tool is held at a fixed height and the optical system is moved vertically. Such vertical movement of the optical system is inconvenient and may result in measurement errors, since the operator may be required to stoop or look down into the optics when measuring a short tool or conversely, to look up into the optics when measuring a long tool. The compound slide arrangements which have been used for support in many conventional machines can also contribute to inaccurate measuring operations.

SUMMARY OF THE INVENTION

The present invention provides an apparatus which is particularly suited for accurately setting and checking the depth and diameter dimensions of tools, such as boring bars. The depth dimension will be understood to mean the distance along the longitudinal axis of the bar between the cutting edge of the tool cutter and the gauge line of the tool arbor. The diameter dimension of the boring bar is its effective cutting diameter and is determined by measuring the radius of the bar between the cutter point and the longitudinal axis of the bar.

In accordance with the preferred embodiment of the invention, the depth dimension of a boring bar is either set or checked by holding and moving the tool vertically from a reference position wherein the gauge line of the tool arbor is a known distance below an optical projector mounted at a convenient viewing height to an elevated position in which the crosshair of the optical projector is centered on the cutting edge of the tool. An optical linear measuring instrument is provided for measuring the depth dimension by gauging the distance between the reference position of the tool and the elevated position in which the crosshair of the projector is centered on the tool cutting edge. The diameter dimension of the tool is either set or checked by moving the projector horizontally between a reference position in which the crosshair of the projector is aligned with the vertical axis of the elevated tool to a position in which the crosshair can be centered on the tool point. A second optical linear measuring instrument is provided for gauging the movement of the projector between the two positions and thereby determining the radius of the tool.

An object of the present invention is to provide an apparatus for accurately measuring tools, and especially for setting and checking depth and diameter dimensions of tools such as boring bars or the like.

A further object of the present invention is to provide a tool measuring and inspecting apparatus in which the tool is mounted and moved vertically, and in which the optical projector and the optical linear measuring instruments of the apparatus are mounted at a convenient viewing height.

A further object of the present invention is to provide a tool measuring and inspecting apparatus including an optical projector, a tool holder for holding a tool in a vertical position, and means for vertically positioning the tool holder and for horizontally positioning the projector to center the projector on the cutting portion of a tool.

Another object of the present invention is to provide a tool measuring and inspecting apparatus including an optical projector mounted for movement along a horizontal axis, a tool holder mounted for movement along a vertical axis, means for moving the tool holder and projector to center the projector on the cutting portion of a tool, and optical linear measuring instruments mounted at convenient viewing heights for determining the amount of movement of the tool holder and the projector.

Still another object of the present invention is to provide a tool measuring and inspecting apparatus especially adapted for setting and checking tool dimensions including an optical projector mounted for movement along a horizontal Y-axis, a tool holder for holding and raising a tool vertically, means for moving the tool holder and the projector from reference positions to a position in which the projector is centered on the cutting portion of a tool in the tool holder, and optical linear measuring instruments for gauging the tool dimensions along a vertical X-axis and the Y-axis by measuring the movements of the projector and the tool holder between their reference positions and the centered position of the projector.

A further object of the present invention is to provide apparatus as described above characterized by an improved tool holding assembly for preventing tool deflection and measuring inaccuracies, the tool holding assembly including a vertically movable bar, a rotatable tool holding means carried by the bar, and actuating means for precisely positioning the bar so that the tool carried thereby is in line with an optical projector mounted at a convenient viewing height.

A further object of the present invention is to provide an apparatus as described above characterized by an arrangement including an optical projector mounted at a convenient viewing height on a horizontally positionable precision slide, and actuating means for selectively affecting rough and fine positioning of the slide to center the projector on a cutting portion of a tool.

The invention further provides a measuring and inspecting apparatus of a simplified construction for accurately checking and setting tool dimensions, the construction being characterized by a cylindrical bar which is guided for vertical movement in a precision sleeve and carries a rotatable tool holder, a power drive system for raising and lowering the bar, a fine adjustment drive for precisely positioning the vertical height of the bar, a projector assembly supporting slide mounted adjacent the bar for movement in a direction transverse to the vertical axis of the bar, and structure for selectively affecting rough and fine positioning of the slide.

The present invention resides in certain novel constructions and arrangement of parts, and further objects and advantages will appear from the following description of the preferred embodiment described with reference to the accompanying drawings, which form a part of the specification and in which like reference numerals designate corresponding parts throughout the several views.

BRIEF DESCRIPTION OF THE DRAWINGS

FIG. 4 is an enlarged, fragmentary front elevational view of an upper portion of the apparatus with portions in cross section, FIG. 5 is a side elevational view partially in cross section of the portion of the apparatus shown in FIG. 5;

FIG. 6 is an enlarged, vertical cross-sectional view of a lower portion of the apparatus;

FIG. 7 is an enlarged, fragmentary cross-sectional view of a portion of the apparatus;

FIG. 8 is an enlarged, fragmentary cross-sectional view of another portion of the apparatus; and, FIG. 9 is a view of the projector screen of the apparatus showing the crosshairs thereof and the image of the cutter element of an illustrative tool.

DESCRIPTION OF THE PREFERRED EMBODIMENT

Figure 1:
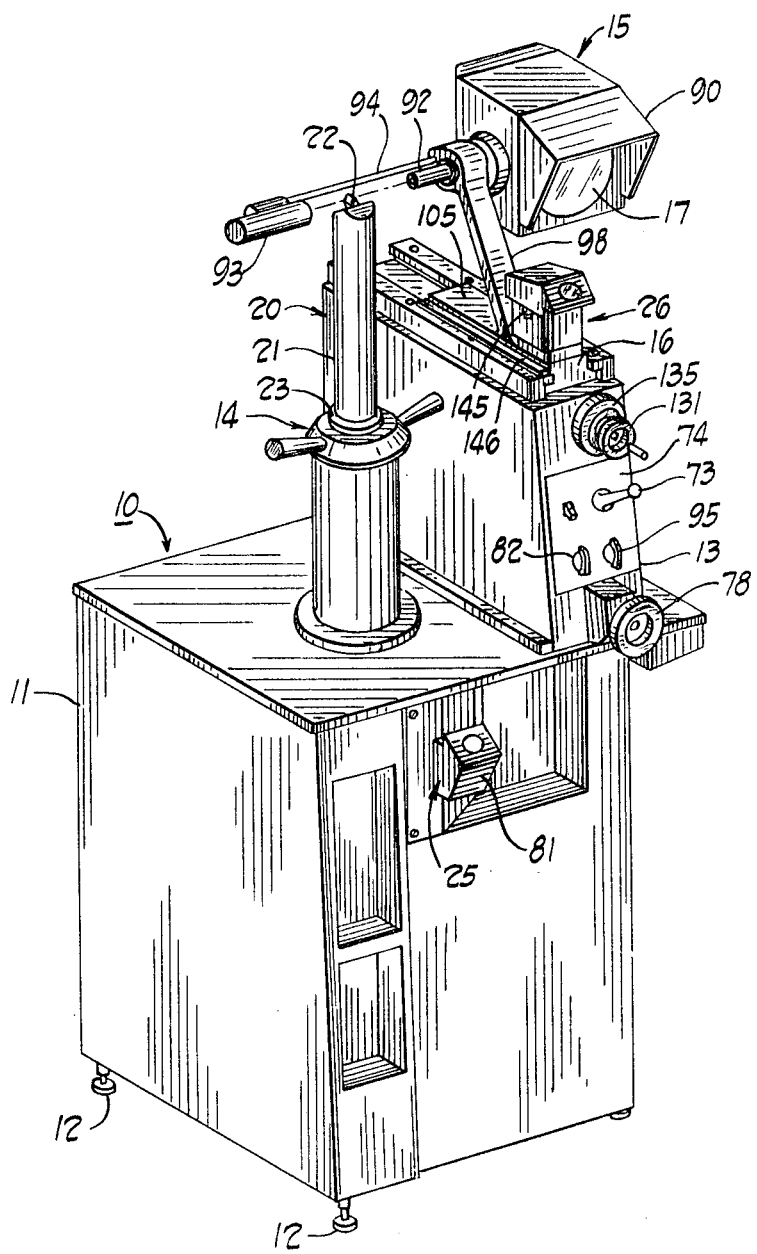
FIG. 1 is a perspective view of the measuring and inspecting apparatus of this invention.
Figure 2:
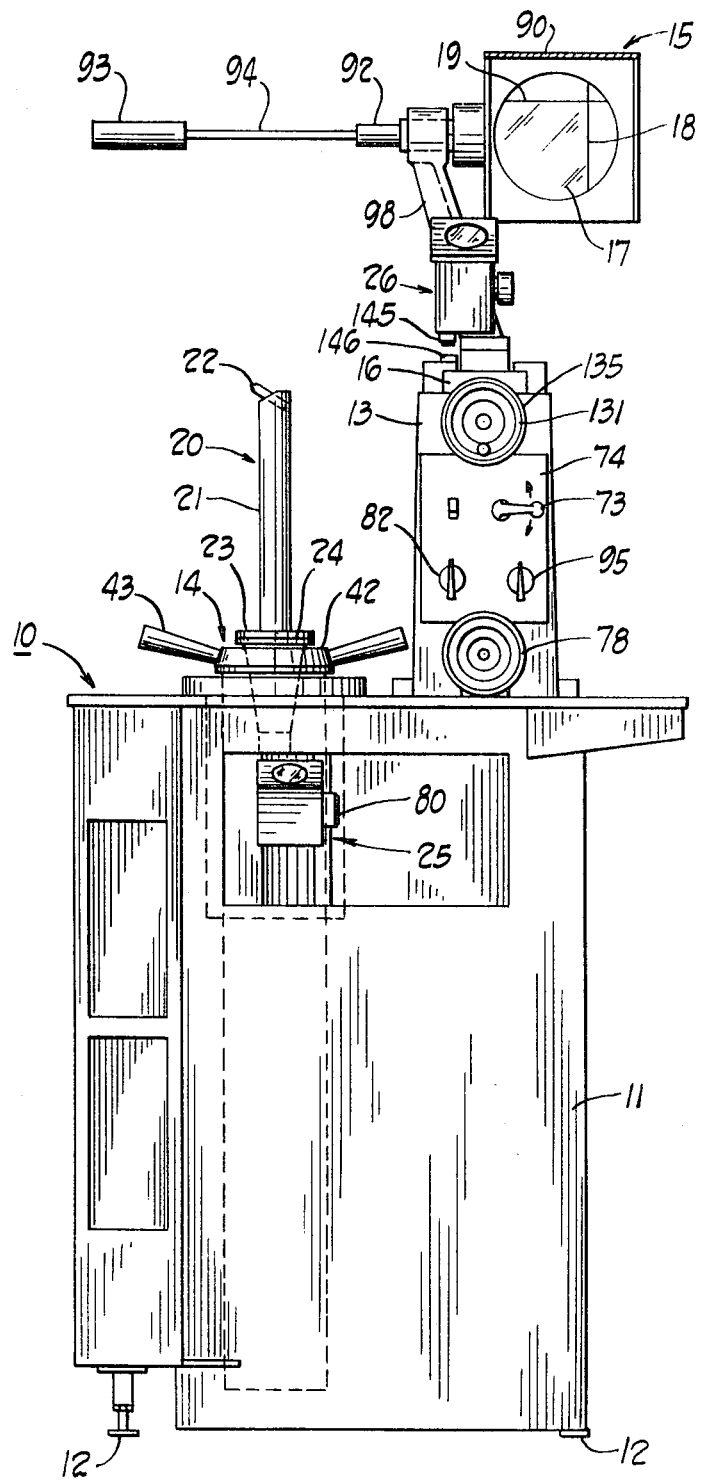
FIG. 2 is a front elevational view of the apparatus shown in FIG. 1.
Figure 3:
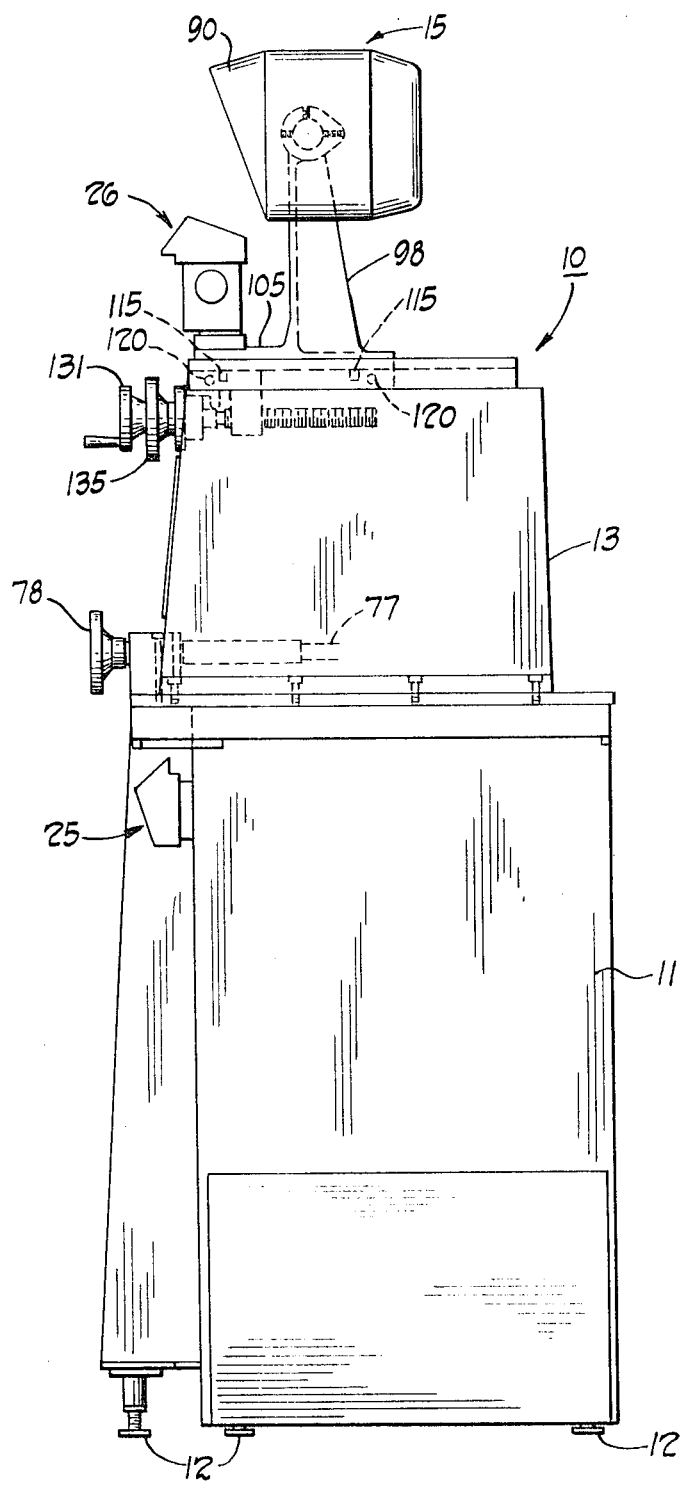
FIG. 3 is a side elevational view of the apparatus shown in FIG. 1.

Referring now to the drawings, and to FIGS. 1—3 in particular, the preferred embodiment of the tool checking and setting apparatus of this invention is generally designated by reference numeral 10. The illustrated structure of the apparatus 10 includes a base 11 supported on four leveling screws 12, and a riser block 13 mounted on the upper surface of the base. A tool holder assembly 14 for raising and lowering the tool to be checked or set is vertically mounted in the base 11 to extend above its upper surface adjacent the riser block. The riser block 13 supports an optical projector assembly 15 which is carried on a horizontally adjustable precision slide 16. As discussed in more detail below, the projector assembly 15 is mounted for use in measuring tool dimensions along X- and y-axes. The X-axis of measurement, used for gauging depth dimensions, is parallel to the vertical axis of the tool holder assembly 14. The Y-axis of measurement, used for gauging diameter dimensions, lies in a plane transverse to the vertical axis of the tool holder assembly 14 and is parallel to the direction of movement of the slide 16.

When using the apparatus 10 to measure depth and diameter dimensions, a tool, such as a boring tool 20 which includes a bar 21, a cutter 22 and an arbor flange 23, is vertically mounted in the tool holder assembly 14. The assembly 14 is raised from a reference position to an elevated position shown in FIG. 1 in which the cutter 22 can be brought into line with the optical projector assembly 15 so that the image of the leading edge of the cutter touches a horizontal crosshair 18 on the viewing screen 17 of the projector assembly 15 (FIG. 9). The depth dimension of the tool, that is, the distance between the lead cutting edge of the cutter 22 and the bar gage line, which is shown at 24 on the arbor flange 23, is determined by means of an optical, linear measuring instrument 25 which measures vertical movement of the tool holder assembly 14 between the reference position and the elevated position. In order to determine the diameter dimension of the tool 20, the slide 16 is horizontally adjusted along the Y-axis from a zero reference position in which a vertical crosshair 19 on the projector screen 17 is aligned with the vertical axis of the tool 20 to a position in which the crosshair 19 is centered on the point of the cutter 22. The radius of the tool is then determined by another optical, linear measuring instrument 26 which is mounted on the top of the slide 16 to measure the movement of the slide 16.

The construction of the vertically movable tool holder assembly 14 and the drive system therefor are shown in FIG. 6. As illustrated in FIG. 6, the tool holder assembly 14 is comprised of a cylindrical bar 30 which is guided for vertical movement within a surrounding precision sleeve 31 extending upwardly through the top surface of the base 11. The upper end of the sleeve 31 has a flange 32 and is secured to the upper surface of the base 11 by dowel pins 33 and screws 34. The axially movable bar 30 is prevented from rotating by a key 35 which is mounted in the sleeve 31 and extends into a keyway 36 formed along the length of the bar 30.

An inner sleeve 38 having a conically tapered arbor socket 39 which opens on the upper end of the sleeve is rotatably mounted in the upper end of the bar 30 by bearings 40. In the illustrated construction, an annular plate 41 is secured to the lower end of the rotatable inner sleeve 38. The upper end of the sleeve 38 which extends above the bar 30 is formed with a flange 42 to which is secured a projecting handle 43 for rotatably adjusting the position of the sleeve 38.

The illustrative tool 20 has a tapered arbor or shank 50 adapted to be seated and locked in the tapered socket 39 of the sleeve 38. As shown, an adapter 51 may be threaded into the end of the tool shank or arbor 50 and to project therefrom.

The projecting portion of the adapter 51 includes a knob or enlargement 52 which has frustoconical wedge surfaces sloping toward opposite ends of the adapter. Three detents 53 (only one of which is shown) are mounted through the wall of the rotatable inner sleeve 38 and cooperate with the knob or enlargement 52 of the adapter to releasably secure the tool arbor 50 in the socket 39 in the manner shown in FIG. 6. It is to be understood that the adapter 51 is not essential to the operation of the apparatus. The adapter can be eliminated or other structure can be used to secure the tool arbor 50 in the socket 39.

The cylindrical bar 30 together with the rotatably carried sleeve 38 is reciprocated vertically by a feed screw 60 which extends upwardly within the bar 30. The lower end of the feed screw 60 is rotatably journaled in the bottom of the base 11 by a bearing 61 and the upper end of the feed screw is adapted to extend through the center of the plate 41 when the tool holder assembly 14 is in a lowered position. A not 62 having internal threads is fixed within the lower end of the bar 30 in threaded engagement with the screw 60, whereby rotation of the feed screw causes vertical movement of the bar 30. As shown in FIG. 6, a stop member 63 is mounted in the upper end of the feed screw 60 for engagement with the end of the adapter enlargement 52 when the assembly 14 is moved to its lowered position. The engagement of the stop member 63 with the lower end of the adapter enlargement 52 serves to push the adapter enlargement upwardly past the detents 53, thereby releasing the tool 20 for removal from the arbor socket 39.

A motor 64 is mounted within the base 11 to affect rotation of the feed screw 60 and consequent power adjustment of the bar 30. A drive pulley 65 is mounted on the output shaft of the electric motor 64 and is connected by a V-belt 66 to a pulley 67 which is keyed to a rotatable, intermediate shaft 68. The shaft 68 is rotatably journaled in a support structure 69 secured to the bottom of the base 11. A second pulley 70 is mounted on the rotatable shaft 68 near its lower end and is connected by a V-belt 71 to a pulley 72 which is keyed to the lower end of the feed screw 60. The electric motor 64 is actuatable in either direction to raise or lower the bar 30 by means of a switch 73 on the control panel 74 of the riser block 13 (FIG. 1).

The lower position of the bar 30 is shown in FIG. 6 is controlled by a limit switch 75 which is in operative circuit relation with the motor 64 and the control switch 73. The limit switch 75 is mounted on the inside of the base 11 so that the pivoted arm 76 of the switch is in position to be contacted by the lower end of the bar 30. When the bar 30 is lowered by actuation of the motor 64, the end of the bar contacts the arm 76 to pivot it downwardly as viewed in FIG. 6 to shut off the motor. The circuit of the switch 75 is of conventional form such that the switch is bypassed when the motor 64 is actuated in the opposite direction to raise the bar 30.

Manual fine adjustment of the vertical height of the bar 30 is obtained by means of a flexible shaft 77 which is secured to the upper end of the intermediate shaft 68 and extends upwardly in connection with a fine adjustment wheel 78 (FIG. 5). The fine adjustment wheel 78 is pinned to a shaft 79 which is rotatably journaled through the riser block 13 below the control panel 74 and is connected to the end of the flexible shaft 77.

The linear measuring instrument 25 for determining the depth dimension of the tool 20 is of a standard, commercially available construction sold by the Heidenhain Corporation of Niles, Ill. and is known as a DOM instrument. The construction of the DOM instrument 25, which does not form a part of the present invention, includes a lamp, a lens system, an accessible adjustment knob 80 for incrementally adjusting and aiming the lens system, and a screen viewable through a readout window. As shown, the instrument 25 is provided with a 40° prism head 81 which permits the instrument screen to be read conveniently by the operator. A variable transformer (not shown) is preferably provided for turning the lamps in the two instruments 25, 26 on and off and for controlling their brightness. The transformer is operated by a knob 82 located on the control panel 74.

As shown in FIG. 6, the DOM instrument 25 extends through a front wall of the base 11 and is mounted to a plate 83 which is secured to a flat surface of the sleeve 31. The lens tube 84 of the DOM instrument 25 extends into a hole through the sleeve 31 and is aimed toward a vertically extending, linear scale 85 which is suitably mounted on a flat, vertical surface of the bar 30. The scale 85 may be calibrated as desired, for example, to obtain a reading of 0.0001 inch, the scale 85 is mounted on the bar 30 so that the lowest number on the scale is at its lower end and the highest number is at its upper end. When the bar 30 is in the lowered position shown in FIG. 6, the gage line 24 of the tool 20 will be a known distance, for example, 24 inches, below the optical axis or line of sight of the projector assembly 15 represented by the horizontal crosshair 18 and the 24-inch increment of the scale can be read through the window of the DOM instrument 25. When the bar 30 is elevated by actuation of the motor 64 and the fine adjustment wheel 78 so that the lead cutting edge of the tool cutter 22 touches the projection screen crosshair 18, the distance between the leading cutting edge and the tool gage line 24, that is, the depth dimension of the tool, can be read from the DOM instrument 25.

The projector assembly 15 is also of a commercial construction available from Stocker & Yale, Inc. of Marblehead, Mass. As shown, the projector assembly 15 includes a hood 90 for the projection screen 17, a lens system including a lens tube 92, and an illuminator 93. The illuminator may be turned on or off and brightness of the illuminator controlled by means of a variable transformer (not shown) and a control knob 95 on the control panel 74. As shown in FIG. 1, the illuminator 93 is mounted on the end of a rod 94 and is aimed toward the lens tube 92 so that the optical line of sight or axes of the projector assembly is horizontal. It will be understood that, when the tool 20 is positioned vertically to align the lead edge of the tool cutter 22 with the optical axis of the projector assembly 15, the tool cutter will be visible on the projection screen 17 as touching the horizontal crosshair 18.

The projector assembly 15 is mounted to the slide 16 by a bracket 98 so that the assembly can be adjusted along the Y-axis of measurement. Referring now to FIGS. 3, 4 and 5, it will be seen that the support bracket 98 includes a foot portion 105 which is connected by screws 106 to the horizontally movable, precision slide 16. The slide 16 is of a flat way design and is mounted for movement by a pair of spaced cap members 108, 109 which are secured to the upper surface of the riser block 13 by screws 110 to define ways for the slide. Each of the cap members 108, 109 is shown as having an upper flange 111 which is spaced above the upper surface of the riser block to overlie a portion of the upper surface of the slide. According to the preferred construction, the bottom and the guiding side of the slide 16 (the left side as viewed in FIG. 4) are lined with a Teflon compound, as indicated by reference numeral 112, in order to decrease the coefficient of sliding friction.

The slide 16 carries spring-loaded plugs formed of a Teflon material which are suitably disposed along the slide to maintain a constant preload on the supporting surfaces lined with the Teflon material 112. The left side of the slide 16, as viewed in FIGS. 4 and 8, has a pair of spaced, vertical recesses which open on the upper surface of the slide. A plug 113 formed of a Teflon material or the equivalent is disposed within each recess and is biased by Belleville washers or other spring means 114 against the undersurface of the flange 111 of the way cap 108. A similar pair of spaced, spring biased plugs 115 are mounted along the opposite side of the slide (FIG. 3) for cooperative engagement with the undersurface of the flange 111 of the way cap 109. The side of the slide 16 opposite to the guiding side which is lined with the Teflon material 112 is also formed with a pair of horizontal recesses which are spaced along the length of the slide. A plug 120 of Teflon material is mounted in each of these horizontal recesses and is biased by Belleville washers 121 or other spring means against the inner side surface of the way cap 109.

In accordance with the present invention, a rough adjustment and a fine adjustment actuating structure are provided for positioning the projector assembly supporting slide 16 along the Y-axis of measurement. As shown most clearly in FIGS. 5 and 7, a cylindrical member 125 is mounted in a hole of the slide 16 by a frictional fastener 126 and protrudes below the lower surface of the slide through a slot 127 formed in the top of the riser block 13. A nut 128 is mounted in the protruding portion of the cylindrical member 125 and is threadedly engaged on a rough adjustment feed screw 129. The screw 129 has a rod portion 130 which extends through the front of the riser block 113, and a rough adjustment hand wheel 131 is mounted on the end of the rod portion 130. fine adjustment positioning of the slide 16 is obtained by a hand wheel 135 which is secured by a set screw to the end of a sleeve 136 rotatably mounted on the rod portion 130 by sleeve bearings 137. Thrust bearings 138, 138a are respectively provided at the forward and inner ends of the sleeve 130, and these thrust bearings are preloaded by a pair of Belleville washers 139 engaged between the inner end of the rough adjustment wheel 131 and the bearing 138. The sleeve 136 is externally threaded and is engaged within a nut 140 mounted in the front wall of the riser block 13. When the fine adjustment wheel 135 is turned to rotate the sleeve 136 through the nut 140, the entire feed adjustment structure, including the screw 129, is advanced or retracted horizontally to move the slide 16.

The linear measuring instrument 26 which is used to check or preset the diameter dimension of the tool is a DOM instrument similar to the instrument 25. The DOM instrument 26 is mounted on the forward end of the precision slide 16 so that the lens tube 145 of the instrument is aimed toward a linear scale 146. The scale 146 is similar to the scale 85 used for determining the depth dimension and is mounted on the upper surface of the way cap 108 (FIG. 4). The scale 146 is mounted on the way cap 108 so that the radius of the tool 20 can be read from the DOM instrument 26 when the slide 16 has been moved to cause the point of the tool cutter 19 to touch the crosshair 19.

The optical systems of the described apparatus are set or checked by use of a test gauge (not shown) having a known depth dimension and radius. The test gauge is engaged in the tapered socket 39 of the bar 30 in the manner of the illustrated tool 20 and the bar is raised by actuation of the motor 64 and the fine adjustment wheel 78 until the upper tip of the test gauge touches the crosshair 18. The DOM instrument is then adjusted relative to the scale 85 to obtain a reading of the known depth dimension of the gauge. The other DOM instrument 26 is set or checked by rough and fine adjustment of the slide 16 until the radial tip of the test gauge touches the crosshair 19. The instrument 26 is then adjusted relative to the scale 146 to obtain a reading of the known radius of the gauge.

When the optical systems have been checked and adjusted, the apparatus 10 may be used to check the depth and diameter dimensions of a tool, such as the boring bar 20, by engaging the tool in the tapered socket of the bar 30 and raising the bar and tool by actuation of the motor 64 until the point of the tool cutter 22 is viewable on the projection screen 17 adjacent the horizontal crosshair 18. The fine adjustment hand wheel 78 is then used to vertically position the bar until the lead cutting edge of the tool cutter 22 touches the horizontal crosshair. The depth dimension of the tool 20 can then be determined from the DOM instrument 25. In order to check the diameter dimension of the tool 20, the slide 16 is adjusted until the point of the cutter 22 touches the vertical crosshair 18 viewable on the screen 17 of the projector assembly 15. In order to assure a true radius reading, the tool supporting sleeve 38 should be rotated by the handle 43 to the position in which the high point or crest transcribed by the point of the cutter 22 touches the vertical crosshair. The accurate radius dimension of the tool can then be read from the DOM instrument 26 and the diameter dimension easily obtained by multiplying the reading by two.

The following operations are involved in the setting of tools. When setting the vertical depth dimension of a tool, such as the boring bar 20, the tool is mounted in the tapered socket of the sleeve 38 and the bar 30 is raised vertically until the DOM instrument 25 reads to the required depth setting. The tool cutter 22 is then adjusted until its lead cutting edge touches the horizontal crosshair 19 for depth on the screen 17. when setting the diameter dimension of the tool, the slide 16 is moved until the DOM instrument 26 reads the required radius dimension. The cutter 22 is then adjusted until its high point or crest, found by rotating the sleeve 38, touches the vertical crosshair 19 on the projector screen 17.

It will be apparent from the foregoing that the objectives of providing an apparatus for conveniently and accurately checking and setting the depth and diameter dimensions of a cutting tool are obtained by the described construction of the invention. The optical systems of the apparatus remain at a convenient eye level so that the operator does not have to stoop to read the projector or, conversely, look up into the projector. Since the tool and the tool holder assembly are moved vertically, inaccuracies due to tool deflection are eliminated. It will further be apparent that the objectives of the invention are obtained by an apparatus which is of relatively simple construction.

Many modifications and variations of the invention will be apparent to those skilled in the art in the light of the foregoing detailed disclosure. Therefore, it is to be understood that, within the scope of the appended claims, the invention can be practiced otherwise than as specifically shown and described.

What I claim is:

1. In a tool measuring and inspecting apparatus, the combination comprising: a tool holding assembly including tool holding means mounted for movement along a vertical axis; means operatively connected to said tool holding assembly for raising and lowering said tool holding means; means mounted in association with said tool holding assembly for measuring the amount of vertical movement of said tool holding means; optical projector means disposed above said tool holding means for viewing a tool held therein; means mounting said projector means for movement transversely of said vertical axis; and means mounted in association with said projector means for measuring the amount of movement thereof.

2. In a tool measuring and inspecting apparatus, the combination comprising: a tool holding assembly including tool holding means mounted for movement along a vertical axis; optical projector means mounted above said tool holding assembly for viewing a tool held therein; means operatively connected to said tool holding assembly for raising said tool holding means toward the optical line of sight of said projector means; means including an optical measuring instrument mounted in association with said tool holding assembly for measuring the vertical movement of said tool holding means; means mounting said projector means for movement along a horizontal axis; and means including an optical measuring instrument mounted in association with said projector means for measuring the amount of movement thereof.

3. In a tool measuring and inspecting apparatus, the combination comprising: a tool holding assembly including tool holding means mounted for movement along a vertical axis; optical projector means mounted above said tool holding assembly for viewing a tool held therein; means operatively connected to said tool holding assembly for raising said tool holding means toward the optical line of sight of said projector means; means mounted in association with said tool holding assembly for measuring the amount of vertical movement of said tool holding means; means including an adjustably positionable slide mounting said projector means for movement along a horizontal axis; and means including an optical measuring instrument mounted in association with said projector means for measuring the amount of movement thereof.

4. In an apparatus as claimed in claim 3 wherein said means for measuring the amount of vertical movement of said tool holding means comprises an optical measuring instrument mounted in association with said tool holding assembly.

5. In a tool measuring and inspecting apparatus, the combination comprising: a tool holding assembly including a vertically movable bar and rotatable tool holding means carried by said bar for holding a tool in a vertical position; optical projector means mounted above said tool holding assembly for viewing a tool mounted in said tool holding means; means operatively connected to said bar for raising it toward the optical line of sight of said projector means; means mounted in association with said bar for measuring the amount of vertical movement thereof; means including a precision slide mounting said projector means for movement along a horizontal axis; actuating means connected to said slide for adjustably moving it; and means mounted in operative association with said slide for indicating the amount of movement thereof.

6. In an apparatus as claimed in claim 5 wherein said bar is a cylindrical member.

7. In an apparatus as claimed in claim 5 wherein said means for raising and lowering said bar comprises rough adjustment power actuating means, and means for fine adjustment positioning of said bar.

8. In an apparatus as claimed in claim 5 wherein said actuating means for said slide comprises means for selectively effecting rough and fine positioning movement of said slide.

9. In an apparatus for setting and checking depth and diameter dimensions of tools: optical projector means for viewing a tool and for use in gauging dimensions of the tool along a vertical X-axis and a horizontal Y-axis; a precision slide mounting said projector means for movement along said Y-axis; actuating means for adjustably positioning said slide; first linear measuring means mounted in association with said slide for indicating the amount of movement thereof, said first measuring means including a linear scale and a relatively movable optical instrument aimed toward said scale; a tool holding assembly including a vertically movable bar and rotatable tool holding means carried by said bar for holding a tool in a vertical position; means operatively connected to said bar for raising and lowering it; and second linear measuring means mounted in association with said tool holding assembly for indicating the amount of movement of said bar, said second measuring means including a linear scale and a relatively movable optical measuring instrument aimed toward said scale.

10. In an apparatus as claimed in claim 9 wherein said means for raising said bar comprises a motor operatively connected to said bar for powering it up and down, and manually operable fine adjustment means operatively connected to said bar.

11. In an apparatus as claimed in claim 9 wherein said actuating means for said slide comprises means for selectively affecting rough and fine adjustment of said slide.

12. In a tool measuring and inspecting apparatus, the combination comprising: an optical projector assembly having a horizontal line of sight and including a projection screen provided with first and second crosshairs; means mounting said projector assembly for adjustable movement along a horizontal axis transverse to said line of sight; a tool holding assembly mounted below said projector assembly, said tool holding assembly including a vertically movable member and tool holding means rotatably carried by said member; and means operatively connected to said tool holding assembly for raising and lowering said vertical member.

13. A tool measuring and inspecting apparatus as claimed in claim 11 wherein said member is movable between a lower position and an upper position in which a portion of a tool in said tool holding means is viewable on said projection screen and touches said first crosshair; and including means mounted in association with said tool holding assembly for indicating the amount of movement of said member from said lower position to said upper position.

14. A tool measuring and inspecting apparatus as claimed in claim 12, wherein said projector assembly is movable between a first position in which said second crosshair is centered on the vertical centerline of said tool holding means and a second position in which said second crosshair touches a cutting portion of a tool in said tool holding means; and including means mounted in association with said projector assembly for indicating the amount of movement from said first position to said second position.

15. In an apparatus for setting and checking depth and diameter dimensions of tools: optical projector means for viewing a tool and for use in gauging the dimensions of the tool along a vertical X-axis and a horizontal Y-axis, said projector means including a screen having a vertical crosshair and a horizontal crosshair; a tool holding assembly including a vertically movable bar and rotatable tool holding means carried by said bar for holding a tool in a vertical position; a motor operatively connected to said bar for powering it up and down; manually operable fine adjustment means operatively connected to said bar for adjusting its vertical height so that the cutting edge of a tool in said tool holding means touches said one of said crosshairs of said projector screen; first measuring means for measuring the amount of vertical movement of said bar, said first measuring means including a linear scale on said bar and an optical measuring instrument mounted adjacent said bar and aimed toward said scale; a precision slide mounting said projector means for adjustable movement along said Y-axis so that the point of the tool in said tool holding means touches the other of said crosshairs of said projector screen; actuating means for selectively affecting rough and fine positioning of said slide; and second measuring means mounted in association with said slide for measuring the amount of movement thereof, said second measuring means including a linear scale and a relatively movable optical measuring instrument aimed toward said scale.